(12) United States Patent
Cheong et al.

(10) Patent No.: US 11,476,542 B2
(45) Date of Patent: *Oct. 18, 2022

(54) RECHARGEABLE LITHIUM BATTERY

(71) Applicant: SAMSUNG SDI CO., LTD., Yongin-si (KR)

(72) Inventors: Kwang-Jo Cheong, Yongin-si (KR); Yong-Beom Lee, Yongin-si (KR); Myung-Ro Lee, Yongin-si (KR); Su-Min Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 148 days.

This patent is subject to a terminal disclaimer.

(21) Appl. No.: 16/685,749

(22) Filed: Nov. 15, 2019

(65) Prior Publication Data

US 2020/0083510 A1    Mar. 12, 2020

Related U.S. Application Data

(60) Division of application No. 16/105,912, filed on Aug. 20, 2018, now Pat. No. 10,978,688, which is a
(Continued)

(30) Foreign Application Priority Data

Jun. 14, 2013  (KR) .......................... 10-2013-0068436

(51) Int. Cl.
*H01M 50/449* (2021.01)
*H01M 10/0569* (2010.01)
(Continued)

(52) U.S. Cl.
CPC ......... *H01M 50/449* (2021.01); *H01M 4/386* (2013.01); *H01M 10/0525* (2013.01);
(Continued)

(58) Field of Classification Search
None
See application file for complete search history.

(56) References Cited

U.S. PATENT DOCUMENTS 7,494,743 B2   2/2009   Hirose et al.
7,651,820 B2   1/2010   Shibuya
(Continued)

FOREIGN PATENT DOCUMENTS

CN   101728577 A   6/2010
CN   101872853 A   10/2010
(Continued)

OTHER PUBLICATIONS

Chinese Office Action, with English translation, dated Jan. 9, 2020, for corresponding Chinese Patent Application No. 201410267090.0 (13 pages).
(Continued)

*Primary Examiner* — Daniel S Gatewood
(74) *Attorney, Agent, or Firm* — Lewis Roca Rothgerber Christie LLP (57) ABSTRACT

Disclosed is a rechargeable lithium battery including a positive electrode including a positive active material; a negative electrode including a negative active material; an electrolyte solution including a lithium salt and a non-aqueous organic solvent; and a separator between the positive and the negative electrodes, the separator including a porous substrate and a coating layer positioned on at least one side of the porous substrate. The negative active material includes a Si-based material; the non-aqueous organic solvent includes cyclic carbonate including ethylene carbonate, propylene carbonate, or combinations thereof, the cyclic carbonate being included in an amount of about 20 volume % to about 60 volume % based on the total amount of the non-aqueous organic solvent; and the coating layer includes a fluorine-based polymer, an inorganic compound, or com-
(Continued)

binations thereof. The rechargeable lithium battery has improved cycle-life and high temperature storage characteristics.

16 Claims, 5 Drawing Sheets

Related U.S. Application Data continuation of application No. 14/303,585, filed on Jun. 12, 2014, now Pat. No. 10,056,594.

(51) Int. Cl.

| H01M 10/0567 | (2010.01) |
| H01M 4/38 | (2006.01) |
| H01M 10/0525 | (2010.01) |
| H01M 50/411 | (2021.01) |
| H01M 50/431 | (2021.01) |
| H01M 50/446 | (2021.01) |

(52) U.S. Cl.
CPC ... *H01M 10/0567* (2013.01); *H01M 10/0569* (2013.01); *H01M 50/411* (2021.01); *H01M 50/431* (2021.01); *H01M 50/446* (2021.01); *H01M 2300/004* (2013.01); *H01M 2300/0042* (2013.01)

(56) References Cited

U.S. PATENT DOCUMENTS

| 8,535,826 | B2 | 9/2013 | Jeong et al. | |
| 2005/0014072 | A1 | 1/2005 | Yamaguchi et al. | |
| 2006/0078801 | A1 | 4/2006 | Yamaguchi et al. | |
| 2007/0020525 | A1 | 1/2007 | Kim et al. | |
| 2007/0072074 | A1 | 3/2007 | Yamamoto et al. | |
| 2008/0152998 | A1 | 6/2008 | Murakami et al. | |
| 2009/0081548 | A1 | 3/2009 | Nakura | |
| 2009/0197184 | A1 | 8/2009 | Kawashima | |
| 2009/0246641 | A1 | 10/2009 | Deguchi et al. | |
| 2010/0099018 | A1* | 4/2010 | Kawase | H01M 4/505 429/105 |
| 2011/0091768 | A1 | 4/2011 | Ohashi et al. | |
| 2011/0293977 | A1 | 12/2011 | Kim et al. | |
| 2011/0293990 | A1* | 12/2011 | Ryu | H01M 10/052 429/145 |
| 2011/0293991 | A1 | 12/2011 | Ryu et al. | |
| 2012/0015228 | A1 | 1/2012 | Yoon et al. | |
| 2012/0100436 | A1 | 4/2012 | Inoue et al. | |
| 2012/0107667 | A1 | 5/2012 | Jeong et al. | |
| 2012/0115008 | A1 | 5/2012 | Sano et al. | |
| 2012/0301794 | A1 | 11/2012 | Koh et al. | |
| 2013/0069601 | A1 | 3/2013 | Coowar et al. | |
| 2013/0101886 | A1* | 4/2013 | Jung | H01M 4/505 429/231.95 |

FOREIGN PATENT DOCUMENTS

| CN | 102460817 A | 5/2012 |
| CN | 103066319 A | 4/2013 |
| EP | 2 190 054 A1 | 5/2010 |
| JP | 2007-141467 A | 6/2007 |
| JP | 2013-89593 A | 5/2013 |
| KR | 10-2007-0012057 A | 1/2007 |
| KR | 10-2008-0034400 | 4/2008 |
| KR | 10-2008-0080163 A | 9/2008 |
| KR | 10-0877826 B1 | 1/2009 |
| KR | 10-2010-0071941 A | 6/2010 |
| KR | 10-2011-0130923 | 12/2011 |
| KR | 10-2012-0031236 | 3/2012 |
| KR | 10-2012-0044682 | 5/2012 |
| KR | 10-1173866 B1 | 8/2012 |

OTHER PUBLICATIONS

Korean Office Action dated Jan. 9, 2020, for corresponding Korean Patent Application No. 10-2019-0138007 (7 pages).
Chinese Decision of Rejection, with English translation, dated Dec. 12, 2018, for corresponding Chinese Patent Application No. 201410267090.0 (7 pages).
Chinese Office Action, with English translation, dated Aug. 21, 2019, for corresponding Chinese Patent Application No. 201410267090.0 (14 pages).
EPO Office Action dated Oct. 27, 2016, for corresponding European Patent Application No. 14172451.8 (5 pages).
EPO Office Action dated Sep. 5, 2017, for corresponding European Patent Application No. 14172451.8 (5 pages).
EPO Search Report dated Oct. 21, 2014, for corresponding European Patent application 14172451.8, (7 pages).
EPO Third Party Observations dated Nov. 15, 2018, for corresponding European Patent Application No. 14172451.8 (6 pages).
KIPO Office Action dated Sep. 21, 2016, for corresponding Korean Patent Application No. 10-2013-0068436 (5 pages).
Korean Office Action dated Sep. 27, 2018, for corresponding Korean Patent Application No. 10-2013-0068436 (5 pages).
Korean Patent Abstract for KR 10-2006-0116043 A, which corresponds to KR Publication No. 10-0877826 B1, published Jan. 12, 2009, 2 pages.
SIPO Office Action, with English translation, dated Oct. 24, 2017, for corresponding Chinese Patent Application No. 201410267090.0 (11 pages).
Xu, Kang, "Nonaqueous Liquid Electrolytes for Lithium-Based Rechargeable Batteries," Chemical Reviews, 2004, vol. 104, No. 10, pp. 4303-4417.
U.S. Notice of Allowance dated Dec. 2, 2020, issued in U.S. Appl. No. 16/105,912 (8 pages).
Office Action issued in U.S. Appl. No. 16/105,912 by the USPTO, dated Mar. 27, 2020, 11 pages.
European Patent Office Action for corresponding European Patent Application No. 14 172 451.8, dated May 26, 2020, 4 pages.
Final Office Action issued in U.S. Appl. No. 16/105,912 by the USPTO, dated Jul. 13, 2020, 16 pages.
Notice of Allowance issued in U.S. Appl. No. 16/105,912 by the USPTO, dated Sep. 11, 2020, 9 pages.
Chinese Office Action, with English translation, dated May 31, 2021, issued in corresponding Chinese Patent Application No. 201910327850.5 (17 pages).
EPO Extended European Search Report dated Nov. 5, 2021, issue in corresponding European Patent Application No. 21188939.9 (11 pages).
Office Action, with English Translation, dated Jan. 18, 2022, for corresponding Chinese Patent Application No. 201910327850.5, including the Search Report dated Jan. 9, 2022 (18 pages).
Shen, Peikang, et al., Chemistry for Materials, May 31, 2012, pp. 158-167, with English translation (30 pages).
Chinese Office Action, with English translation, dated Jul. 1, 2022, issued in corresponding Chinese Patent Application No. 201910327850.5 (14 pages).

* cited by examiner

RECHARGEABLE LITHIUM BATTERY

CROSS-REFERENCE TO RELATED APPLICATION

This application is a divisional application of U.S. patent application Ser. No. 16/105,912, filed Aug. 20, 2018, which is a continuation of U.S. patent application Ser. No. 14/303,585, filed Jun. 12, 2014, now U.S. Pat. No. 10,056,594, issued Aug. 21, 2018, which claims priority to and the benefit of Korean Patent Application No. 10-2013-0068436, filed Jun. 14, 2013, the entire contents of all of which are incorporated herein by reference.

BACKGROUND

1. Field

A rechargeable lithium battery is disclosed.

2. Description of the Related Art

A rechargeable lithium battery typically includes a separator made of a porous film and positioned between positive and negative electrodes, and pores of the film are filled with an electrolyte solution in which a lithium salt is dissolved. This rechargeable lithium battery has improved characteristics such as high-capacity and high energy density.

However, when the amount of exothermic reactions of the battery is increased due to the unusual working of the battery, or the positive and the negative electrodes in the battery are repeatedly contracted and expanded during charge and discharge cycles, a battery temperature may be sharply increased. As a result, the separator may become contracted along with the electrodes or altogether destroyed, thus causing a short circuit between the electrodes.

Accordingly, a method of coating the separator with a heat-resistant inorganic particle along with a binder on at least one side to secure stability of the battery has been suggested.

However, as the amount of the heat resistance inorganic particle is increased, the amount of the binder is decreased, and the adherence between the separator and the electrode may deteriorate.

SUMMARY

One or more aspects of embodiments of the present invention are directed towards a rechargeable lithium battery having good adherence between a separator and an electrode, as well as stability, storability at a high temperature, good cycle-life characteristics, and the like.

According to one embodiment, a rechargeable lithium battery includes a positive electrode including a positive active material; a negative electrode including a negative active material; an electrolyte solution including a lithium salt and a non-aqueous organic solvent; and a separator positioned between the positive electrode and the negative electrode, the separator including a porous substrate and a coating layer positioned on at least one side of the porous substrate, wherein the negative active material includes a Si-based material, the non-aqueous organic solvent includes a cyclic carbonate including ethylene carbonate, propylene carbonate or combinations thereof, the cyclic carbonate is included in an amount of about 20 volume % to about 60 volume % based on the total amount of the non-aqueous organic solvent, and the coating layer includes a fluorine-based polymer, an inorganic compound, or a combination thereof.

The Si-based material may include Si, silicon oxide, a Si—C composite, a silicon-based alloy, or combinations thereof.

The non-aqueous organic solvent may further include linear carbonate including ethylmethyl carbonate, diethyl carbonate, or combinations thereof.

The electrolyte solution may include an additive, and the additive may include fluoroethylene carbonate, vinylethylene carbonate, propane sultone, succinonitrile, adiponitrile, or combinations thereof.

The additive may be included in an amount of about 5 parts by weight to about 30 parts by weight based on 100 parts by weight of the non-aqueous organic solvent.

The porous substrate may include polyethylene, polypropylene, aramid, polyimide, or combinations thereof.

The fluorine-based polymer may include polyvinylidene fluoride (PVdF), a polyvinylidene fluoride-hexafluoropropylene (PVdF-HFP) copolymer, or combinations thereof.

The inorganic compound may include $Al_2O_3$, MgO, $TiO_2$, $Al(OH)_3$, $Mg(OH)_2$, $Ti(OH)_4$ or combinations thereof.

Accordingly, the present invention may improve battery characteristics by increasing adherence between the separator and the electrode as well as securing stability, cycle-life characteristics, storability at a high temperature, and the like.

DETAILED DESCRIPTION

Hereinafter, embodiments are described in detail. However, these embodiments are exemplary, and this disclosure is not limited thereto. Further, the use of "may" when describing embodiments of the present invention refers to "one or more embodiments of the present invention."

Figure 1:
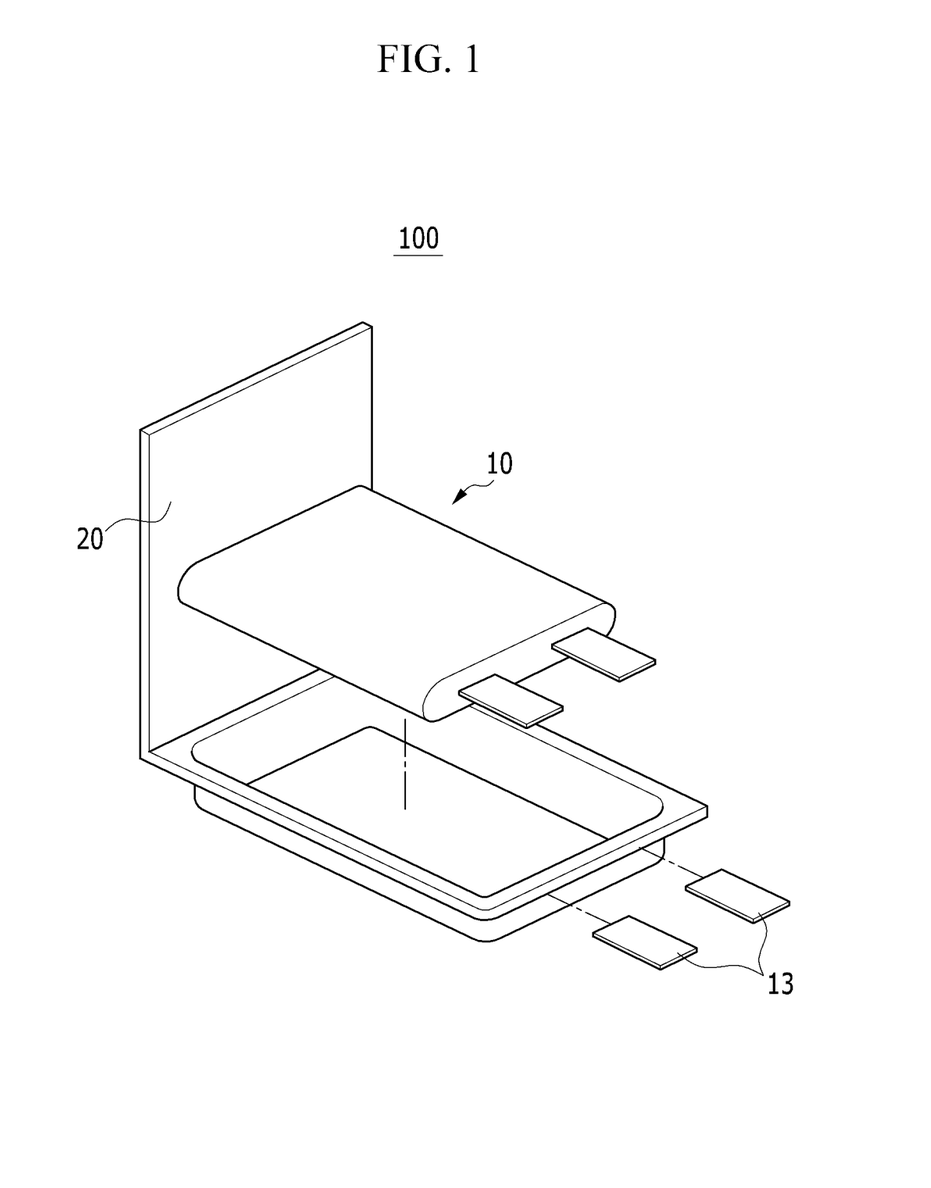
FIG. 1 is a schematic view showing a rechargeable lithium battery according to one embodiment.

A rechargeable lithium battery according to one embodiment is described referring to FIG. 1.

FIG. 1 is a schematic view showing a rechargeable lithium battery according to one embodiment.

Referring to FIG. 1, a rechargeable lithium battery 100 according to one embodiment includes an electrode assembly 10, a battery case 20 housing the electrode assembly 10, and an electrode tab 13, which provides an electrical path for externally leading a current formed in the electrode assembly 10. Both sides of the battery case 20 may be overlapped to face each other and sealed together. In addition, an electrolyte solution may be injected into the battery case 20 housing the electrode assembly 10.

The electrode assembly 10 may include a positive electrode, a negative electrode facing the positive electrode, and a separator positioned between the positive and the negative electrodes.

Specifically, the negative electrode may include a current collector and a negative active material layer formed on the current collector, the negative active material layer including a negative active material.

The negative active material may include a Si-based material. The Si-based material may be Si, silicon oxide, a Si—C composite, a silicon-based alloy, or combinations thereof. In some embodiments, the Si—C composite is prepared by mixing Si and carbon and includes, for example, a Si-nano wire and carbon, a Si-nano particle and carbon, and the like, but is not limited thereto. For example, the silicon-based alloy can be an alloy of 'Si' and 'an alkali metal, an alkaline-earth metal, Group 13 to 16 element, a transition metal, a rare earth element, or combinations thereof (except for Si), but embodiments of the invention are not limited thereto.

The negative active material may be used along with a carbon-based material, a lithium metal alloy, or combinations thereof.

The carbon-based material may be crystalline carbon, amorphous carbon, or combinations thereof. Non-limiting example of the crystalline carbon includes a graphite such as a shapeless, sheet-shaped, flake, spherical shaped or fiber-shaped natural graphite or artificial graphite, and non-limiting examples of the amorphous carbon include soft carbon or hard carbon, a mesophase pitch carbonized product, fired cokes, and the like.

The lithium metal alloy may include an alloy of lithium and a metal selected from Na, K, Rb, Cs, Fr, Be, Mg, Ca, Sr, Si, Sb, Pb, In, Zn, Ba, Ra, Ge, Al, and Sn, but embodiments of the invention are not limited thereto.

In some embodiments, the negative active material layer includes a binder, and optionally a conductive material.

The binder improves binding properties of negative active material particles with one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxymethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 parts by weight to 3 parts by weight based on 100 parts by weight of the negative active material.

In some embodiments, the conductive material improves electrical conductivity of an electrode. Any electrically conductive material suitable for use in a rechargeable lithium battery may be used as a conductive material, unless it causes a chemical change in the battery. Non-limiting examples of the conductive material include a carbon-based material such as natural graphite, artificial graphite, carbon black, acetylene black, ketjen black, a carbon fiber and the like; a metal-based material such as a metal powder or a metal fiber including copper, nickel, aluminum, silver, and the like; a conductive polymer such as a polyphenylene derivative and the like; or a mixture thereof.

The current collector may include a copper foil, a nickel foil, a stainless steel foil, a titanium foil, a nickel foam, a copper foam, a polymer substrate coated with a conductive metal, or combinations thereof.

Hereinafter, the positive electrode according to embodiments of the present invention is described.

The positive electrode may include a current collector and a positive active material layer formed on the current collector.

The positive active material may include lithiated intercalation compounds that reversibly intercalate and deintercalate lithium ions. In some embodiments, at least one composite oxide of lithium and a metal such as cobalt, manganese, nickel, or combinations thereof may be used, and non-limiting examples thereof include compounds represented by one of the following chemical formulae. $Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $LiE_{2-b}R_bO_{4-c}D_c$ ($0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or combinations thereof; R is Al, Ni, Co, Mn, Cr, Fe, Mg, Sr, V, a rare earth element, or combinations thereof; D is O, F, S, P, or combinations thereof; E is Co, Mn, or combinations thereof; Z is F, S, P, or combinations thereof; G is Al, Cr, Mn, Fe, Mg, La, Ce, Sr, V, or combinations thereof; Q is Ti, Mo, Mn, or combinations thereof; T is Cr, V, Fe, Sc, Y, or combinations thereof; and J is V, Cr, Mn, Co, Ni, Cu, or combinations thereof.

The positive active material layer may include the positive active material coated with the coating layer, or a combination of the positive active material and the positive active material coated with the coating layer. The coating layer may include a compound of a coating element and an oxide of a coating element, a hydroxide of a coating element, an oxyhydroxide of a coating element, an oxycarbonate of a coating element, or a hydroxycarbonate of a coating element. The compound in the coating layer may be either amorphous or crystalline. The coating element included in the coating layer may be selected from Mg, Al, Co, K, Na, Ca, Si, Ti, V, Sn, Ge, Ga, B, As, Zr, and a mixture thereof. The coating process may be any conventional coating process as long as it does not cause any side effects on the properties of the positive active material (e.g., spray coating, dipping). Such conventional coating processes are well known to persons having ordinary skill in this art, so a detailed description thereof is omitted.

In some embodiments, the positive active material layer includes a binder and a conductive material.

The binder improves binding properties of positive active material particles with one another and with a current collector. Non-limiting examples of the binder include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but embodiments of the invention are not limited thereto.

In some embodiments, the conductive material improves conductivity of an electrode. Any electrically conductive material suitable for use in a rechargeable lithium battery may be used as a conductive material, unless it causes a chemical change in the battery. Non-limiting examples of the conductive material include one or more of natural graphite, artificial graphite, carbon black, acetylene black, ketjen black, a carbon fiber, a metal powder or a metal fiber of copper, nickel, aluminum, silver, and the like, a polyphenylene derivative, and the like.

The current collector may be Al, but is not limited thereto.

The negative electrode and the positive electrode may be manufactured by a method including mixing each active material, a conductive material, and a binder in a solvent to an active material composition, and coating the composition on a current collector. The electrode manufacturing method is well known in the art, and thus is not described in detail in the present specification. The solvent may include N-methylpyrrolidone and the like, but is not limited thereto. When the water-soluble binder is used in the negative electrode, the solvent may include water.

The electrolyte solution may include a lithium salt and a non-aqueous organic solvent.

In some embodiments, the non-aqueous organic solvent dissolves the lithium salt, and serves as a medium for transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. The ester-based solvent may include methyl acetate, ethyl acetate, n-propyl acetate, 1,1-dimethylethyl acetate, methyl propinonate, ethyl propinonate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran and the like, and the ketone-based solvent may include cyclohexanone, and the like. The alcohol-based solvent may include ethanol, isopropyl alcohol, and the like. The aprotic solvent may include nitriles such as R-CN (wherein R is a C2 to C20 linear, branched, or cyclic hydrocarbon group, and may include a double bond, an aromatic ring, or an ether bond), amides such as dimethylformamide, dioxolanes such as 1,3-dioxolane, sulfolanes, and the like.

The non-aqueous organic solvent may be used alone or in a mixture. When the organic solvent is used in a mixture, the mixture ratio may be controlled in accordance with a desirable battery performance.

In some embodiments, the non-aqueous organic solvent may include cyclic carbonate including ethylene carbonate, propylene carbonate, or combinations thereof. In some embodiments, the cyclic carbonate may be included in an amount of about 20 volume % to about 60 volume % based on the total amount of the non-aqueous organic solvent. In other embodiments, the cyclic carbonate may be included in an amount of about 20 volume % to about 55 volume %, about 20 volume % to about 50 volume %, about 20 volume % to about 45 volume % or about 20 volume % to about 40 volume % based on the total amount of the non-aqueous organic solvent.

In certain embodiments, the cyclic carbonate is ethylene carbonate and may be included in an amount of about about 20 volume % to about 60 volume %, 20 volume % to about 55 volume %, about 20 volume % to about 50 volume %, about 20 volume % to about 45 volume % or about 20 volume % to about 40 volume % based on the total amount of the non-aqueous organic solvent.

In one embodiment, the carbonate based solvent may include cyclic carbonate and linear carbonate. The linear carbonate may include ethylmethyl carbonate, diethyl carbonate, or combinations thereof.

In some embodiments, the non-aqueous organic solvent may include about 20 volume % to about 60 volume % of each of ethylene carbonate (EC), propylene carbonate (PC) or a combination thereof, and about 80 volume % to 40 volume % of ethylmethyl carbonate (EMC), diethyl carbonate (DEC), or a combination thereof. In other embodiments, the non-aqueous organic solvent may include about 30 volume % to about 50 volume % of ethylene carbonate (EC), propylene carbonate (PC) or a combination thereof, and about 70 volume % to 30 volume % of ethylmethyl carbonate (EMC), diethyl carbonate (DEC), or a combination thereof. If the cyclic carbonate includes both ethylene carbonate (EC) and propylene carbonate (PC) the amount of ethylene carbonate (EC) may be about 10 volume % to about 30 volume % and the amount of propylene carbonate (PC) may be about 5 volume % to about 30 volume % so that the total amount of propylene carbonate (PC) and ethylene carbonate (EC) may be about 20 volume % to about 60 volume % based on the total amount of the non-aqueous organic solvent. In certain embodiments, the non-aqueous organic solvent may include ethylene carbonate (EC) in an amount of about 25 volume % to 35 volume % and propylene carbonate (PC) in an amount about 10 volume % to about 20 volume % based on the total amount of the non-aqueous organic solvent. Furthermore, if the linear carbonate includes ethylmethyl carbonate (EMC) and diethyl carbonate (DEC), the amount of ethylmethyl carbonate (EMC) may be about 10 volume % to about 70 volume % and the amount of diethyl carbonate (DEC) may be about 10 volume % to about 70 volume % so that the total amount of ethylmethyl carbonate (EMC) and diethyl carbonate (DEC) may be about 80 volume % to about 40 volume % based on the total amount of the non-aqueous organic solvent. In other embodiments of the invention wherein the linear carbonate includes ethylmethyl carbonate (EMC) and diethyl carbonate (DEC), the amount of ethylmethyl carbonate (EMC) may be about 20 volume % to about 60 volume %, about 25 volume % to about 60 volume %, about 30 volume % to about 60 volume %, or about 35 volume % to about 55 volume % and the amount of diethyl carbonate (DEC) may be about 10 volume % to about 70 volume %, about 10 volume % to about 60 volume %, about 10 volume % to about 50 volume %, about 10 volume % to about 40 volume %, about 20 volume % to about 40 volume % or about 25 volume % to about 35 volume %, so that the combined amount of ethylmethyl carbonate (EMC) and diethyl carbonate (DEC) may be about 80 volume % to about 40 volume %, 80 volume % to about 50 volume %, 80 volume % to about 55 volume %, 80 volume % to about 60 volume % or 80 volume % to about 70 volume % based on the total amount of the non-aqueous organic solvent.

When cyclic carbonate is included in an amount of about 20 volume % to about 60 volume %, about 20 volume % to about 55 volume %, about 20 volume % to about 50 volume %, about 20 volume % to about 45 volume % or about 20 volume % to about 40 volume %based on the total amount of the non-aqueous organic solvent, a polymer layer coated on the surface of the separator may be easily dissolved in an electrolyte solution and thus, may improve compression strength of the separator and adherence between the electrode and the separator, and may prevent sharp contraction and deformation of the separator during charge and discharge, thus improving cycle-life characteristics of a battery.

The non-aqueous organic solvent may further include an aromatic hydrocarbon-based organic solvent as well as the carbonate based solvent. In some embodiments, the carbonate-based solvent and the aromatic hydrocarbon-based organic solvent are mixed together in a volume ratio of about 1:1 to about 30:1, about 2:1 to about 30:1, about 4:1 to about 30:1, about 6:1 to about 30:1, about 8:1 to about 30:1, about 10:1 to about 30:1, about 15:1 to about 30:1 or about 20:1 to about 30:1.

The aromatic hydrocarbon-based organic solvent may be an aromatic hydrocarbon-based compound represented by the following Chemical Formula 1.

Chemical Formula 1

In the above Chemical Formula 1, $R_1$ to $R_6$ are each independently a hydrogen atom, a halogen, a C1 to C10 alkyl group, a C1 to C10 haloalkyl group, or combinations thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or combinations thereof.

The non-aqueous organic solvent may further include vinylene carbonate or an ethylene carbonate-based compound represented by the following Chemical Formula 2 in order to improve cycle-life of a battery.

Chemical Formula 2

In the above Chemical Formula 2, $R_7$ and $R_8$ are each independently selected from a hydrogen atom, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

Non-limiting examples of the ethylene carbonate-based compound include difluoro ethylene carbonate, chloroethylene carbonate, dichloroethylene carbonate, bromoethylene carbonate, dibromoethylene carbonate, nitroethylene carbonate, cyanoethylene carbonate, and the like. The amount of the vinylene carbonate or the ethylene carbonate-based compound used to improve cycle life may be adjusted within an appropriate range.

The electrolyte solution may further include an additive, and the additive may include fluoroethylene carbonate, vinylethylene carbonate, propane sultone, succinonitrile, adiponitrile, or combinations thereof. In certain embodiments, the additive is fluoroethylene carbonate.

In some embodiments, the additive may be included in an amount of about 5 parts by weight to about 30 parts by weight, about 7 parts by weight to about 30 parts by weight, about 10 parts by weight to about 30 parts by weight, about 12 parts by weight to about 30 parts by weight, about 15 parts by weight to about 30 parts by weight, about 17 parts by weight to about 30 parts by weight, or about 20 parts by weight to about 30 parts by weight based on 100 parts by weight of the non-aqueous organic solvent.

In embodiments of the present invention wherein the additive is fluoroethylene carbonate, the additive may be included in an amount of about 5 parts by weight to about 30 parts, about 7 parts by weight to about 30 parts by weight, about 10 parts by weight to about 30 parts by weight, about 12 parts by weight to about 30 parts by weight, about 15 parts by weight to about 30 parts by weight, about 17 parts by weight to about 30 parts by weight, or about 20 parts by weight to about 30 parts by weight based on 100 parts by weight of the non-aqueous organic solvent.

When the additive is included in the non-aqueous organic solvent within the described range, the amount of cyclic carbonate may be increased in the electrolyte solution and, in some embodiments, may cause a decomposition reaction on the surface of an electrode and may form a stable passivation film, thus improving cycle-life characteristics of a battery, and flame retardancy of the electrolyte solution, as well as increasing stability.

In some embodiments, the lithium salt is dissolved in the electrolyte solution in order to operate the rechargeable lithium battery and improve lithium ion transfer between the positive and the negative electrodes by supplying lithium ions in a rechargeable lithium battery. The lithium salt may include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis (oxalato) borate, LiBOB), and combinations thereof. In certain embodiments, the lithim salt may include $LiPF_6$. The lithium salt may be used in a concentration of about 0.1 M to about 2.0M, about 0.1 M to about 1.8M, about 0.3M to about 1.8M, about 0.3M to about 1.5M, about 0.5M to about 1.5M, about 0.7M to about 1.5M, about 0.7M to about 1.3M, about 1.0M to about 1.3M or about 1.1M to about 1.2M. In embodiments of the present invention wherein the lithium salt includes $LiPF_6$, the $LiPF_6$ may be used in a concentration of about 0.1 M to about 2.0M, about 0.1 M to about 1.8M, about 0.3M to about 1.8M, about 0.3M to about 1.5M, about 0.5M to about 1.5M, about 0.7M to about 1.5M, about 0.7M to about 1.3M, about 1.0M to about 1.3M or about 1.1M to about 1.2M. When the lithium salt is included within the above-described concentration range, an electrolyte including a non-aqueous organic solvent, an additive, a lithium salt, and the like may have appropriate conductivity and viscosity and thus, may improve electrolyte performance and effectively transfer lithium ions.

Hereinafter, the separator is described, according to one or more embodiments of the invention.

The separator may be manufactured by a method which includes coating a coating slurry including the fluorine-based polymer, the inorganic compound, or a combination thereof in a solvent, on at least one surface of a porous substrate, and drying the slurry to form a coating layer. The solvent may be acetone, dimethylformamide, N-methylpyrrolidone, cyclohexanone, or a combination thereof.

The fluorine-based polymer may include polyvinylidene fluoride (PVdF), a polyvinylidene fluoride-hexafluoropropylene (PVdF-HFP) copolymer, or combinations thereof. In another embodiment, the fluorine-based polymer may be a mixture of first and second binder polymers having a different particle size, or a solvent-soluble binder polymer or an emulsion binder polymer.

The concentration of coating slurry may be controlled in order to have an amount of the fluorine-based polymer of about 1 $g/m^2$ to 3 $g/m^2$ in the coating layer, or in order to have an amount of the mixed fluorine-based polymer and the inorganic compound of about 2 $g/m^2$ to 6 $g/m^2$ in the coating layer.

The drying of the slurry may include, for example, hot air drying, UV drying, and the like, at a drying rate of about 30%/min to about 70%/min.

In embodiments of the present invention, the drying rate of about 30%/min to about 70%/min indicates a speed at which about 30% to about 70% of a solvent included in the slurry per one minute is dried and may be determined based on the drying temperature, supplied air amount, discharged air amount, wind speed, heating method, and the like.

When the drying is performed within the drying rate range, a crack on or deformation of the surface may be prevented, and the binder polymer may also sufficiently move toward the surface.

In some embodiments, the drying may be performed at a drying rate of about 40%/min to about 60%/min within the range.

The drying temperature may be determined by various factors such as a type of solvent and atmosphere conditions during the drying. The drying temperature may be in a range from about 45° C. to about 110° C., and in some embodiments from about 50° C. to about 90° C., and in some embodiments from about 60° C. to about 80° C. When the drying is performed within the temperature range, the solvent may be removed without excessive contraction of a porous substrate.

In an embodiment of the present invention, the separator is located between the positive electrode and the negative electrode, and includes a porous substrate and a coating layer positioned on at least one side of the porous substrate, the coating layer including a fluorine-based polymer, an inorganic compound, or combinations thereof.

In an embodiment of the present invention, the porous substrate includes polyethylene, polypropylene, aramid, polyimide, or combinations thereof.

When the porous substrate is polyethylene, polypropylene, aramid, polyimide, or combinations thereof, the coating layer may be easily coated thereon.

In some embodiments, the fluorine-based polymer includes polyvinylidene fluoride (PVdF), a polyvinylidene fluoride-hexafluoropropylene (PVdF-HFP) copolymer, or combinations thereof.

In some embodiments, the inorganic compound includes $Al_2O_3$, MgO, $TiO_2$, $Al(OH)_3$, $Mg(OH)_2$, $Ti(OH)_4$ or combinations thereof.

According to some embodiments, the separator has improved adherence when using the coating layer including fluorine-based polymer, inorganic compound, or combinations thereof and thus, may be more stably bound with an electrode in a pouch-type battery using a flexible packing material such as a lamination film and the like, and may prevent detachment of the electrode from the separator and generation of a gap therebetween.

In addition, the fluorine-based polymer, inorganic compound, or combinations thereof may be more easily dispersed in the electrolyte solution composition and may form a polymer gel, thus preventing sharp contraction or deformation of the separator during charge/discharge and improving cycle-life characteristics of a battery.

An entire thickness of the separator may be determined based on the capacity of the battery. For example, the separator may have a thickness ranging from about 10 μm to about 30 μm. A polymer coating layer may have a thickness of about 0.1 μm to about 5 μm on one side of the separator. When the polymer coating layer has a smaller thickness than the range, sufficient heat resistance may not be obtained. Furthermore, when the polymer coating layer has a larger thickness than the range, the polymer coating layer may increase the overall thickness of the separator and thus, may decrease battery capacity.

The separator manufactured using the method according to embodiments of the present invention separates the positive electrode from the negative electrode and provides a path for lithium ions, [and its detailed description is the same as described above].

Hereinafter, a rechargeable lithium battery including the aforementioned positive electrode, negative electrode, electrolyte solution, and separator is illustrated, according to one or more embodiments of the present invention.

Rechargeable lithium batteries may be classified as lithium ion batteries, lithium ion polymer batteries, and lithium polymer batteries according to the presence of a separator and the kind of electrolyte used in the battery. The rechargeable lithium batteries may also be classified as cylindrical, prismatic, coin-type, or pouch-type batteries according to shapes, and may be classified as thin film or bulk batteries. According to one embodiment, a rechargeable lithium battery may be a pouch-type battery. Structures and manufacturing methods for lithium ion batteries pertaining to this disclosure are well known in the art.

Hereinafter, the present disclosure is illustrated in more detail with reference to examples. However, these examples are exemplary, and the present disclosure is not limited thereto.

EXAMPLE 1

97.0 wt % of $LiCoO_2$ as a positive active material, 1 wt % of denka black as a conductive material, and 2 wt % of polyvinylidene fluoride (PVdF) as a binder were added to an N-methylpyrrolidone (NMP) solvent, preparing a positive active material composition. The positive active material composition was coated on an aluminum (Al) thin film, dried, and roll-pressed, manufacturing a positive electrode.

(2) 97 wt % of a negative active material (3 wt % of $SiO_x$ (x is in a range of 1.0 to 1.5)+97 wt % of Graphite), 1 wt % of carboxylmethyl cellulose as a thickener, and 2 wt % of a styrene-butadiene rubber as a binder were added to distilled water, preparing a negative active material composition. The negative active material composition was coated on a copper foil, dried, and roll-pressed, manufacturing a negative electrode.

(3) An electrolyte solution was prepared by mixing ethylene carbonate (EC), ethylmethyl carbonate (EMC), and diethyl carbonate (DEC) in a volume ratio of 20:50:30 and adding 1.15M $LiPF_6$ and 5 parts by weight of fluoroethylene carbonate (FEC) (based on 100 parts by weight of the mixed solvent) to the mixed solvent.

(4) Polyvinylidene fluoride-hexafluoropropylene (PVdF-HFP) copolymer was dissolved in acetone, and the solution was gravure-coated on both sides of a 9 μm-thick polyethylene (PE) separator. Thereafter, the resultant was dried at a temperature of 75° C. at a drying rate of about 50%/min, to produce a separator with a PVdF coating layer. The coating layer was 1.5 μm-thick on each side, and had an amount of polyvinylidene fluoride-hexafluoropropylene of 2 $g/m^2$.

(5) The positive electrode, the negative electrode, and the separator were manufactured into an electrode assembly, the electrode assembly was put in a battery case, the electrolyte solution was injected into the battery case, and the battery case was sealed and charged up to 3.8 V to form a film on the negative electrode.

Subsequently, a pouch-type battery cell was manufactured by performing a heat-pressing process to gelate a PVdF layer on the separator and to closely adhere the separator to the substrate and then, a vacuum-sealing process.

EXAMPLE 2

A pouch-type battery cell was manufactured according to the same method as Example 1 except for mixing ethylene carbonate, ethylmethyl carbonate, and diethyl carbonate in a volume ratio of 30:40:30 instead of 20:50:30.

EXAMPLE 3

A pouch-type battery cell was manufactured according to the same method as Example 2 except for using fluoroethylene carbonate (FEC) in an amount of 7 parts by weight instead of 5 parts by weight.

EXAMPLE 4

A pouch-type battery cell was manufactured according to the same method as Example 2 except for using fluoroethylene carbonate (FEC) in an amount of 10 parts by weight instead of 5 parts by weight.

EXAMPLE 5

A pouch-type battery cell was manufactured according to the same method as Example 2 except for using fluoroethylene carbonate (FEC) in an amount of 15 parts by weight instead of 5 parts by weight.

EXAMPLE 6

A pouch-type battery cell was manufactured according to the same method as Example 2 except for using fluoroethylene carbonate (FEC) in an amount of 20 parts by weight instead of 5 parts by weight.

EXAMPLE 7

A pouch-type battery cell was manufactured according to the same method as Example 2 except for using fluoroethylene carbonate (FEC) in an amount of 30 parts by weight instead of 5 parts by weight.

EXAMPLE 8

A pouch-type battery cell was manufactured according to the same method as Example 1 except for mixing the ethylene carbonate, propylene carbonate, ethylmethyl carbonate, and diethyl carbonate in a volume ratio of 30:15:25:30 instead of mixing ethylene carbonate, ethylmethyl carbonate and diethyl carbonate in a volume ratio of 20:50:30 and using the fluoroethylene carbonate in an amount of 10 parts by weight instead of 5 parts by weight.

COMPARATIVE EXAMPLE 1

A pouch-type battery cell was manufactured according to the same method as Example 1 except for mixing the ethylene carbonate, ethylmethyl carbonate, and diethyl carbonate in a volume ratio of 10:60:30 instead of 20:50:30.

COMPARATIVE EXAMPLE 2

A pouch-type battery cell was manufactured according to the same method as Example 1 except for using a polyethylene separator having no coating layer.

Evaluation 1: Compression Strength Evaluation

The electrolyte solutions according to Examples 1 to 8 and Comparative Example 1 and 1.5 wt % of PVdF powder were weighed and placed in their respective vials. The mixtures were put in a 100° C. oven to dissolve the PVdF, and the solutions were cooled down to room temperature, preparing cylindrical gels having a diameter of 20 mm and a height of 15 mm.

The obtained gels were positioned between upper and lower anvils in a property tester (Instron 3344) and compressed to a break point at a speed of 100 mm/min and then, measured regarding compression strength. The compression strength measurement results are provided in the following Table 1 and FIG. 2.

Figure 2:
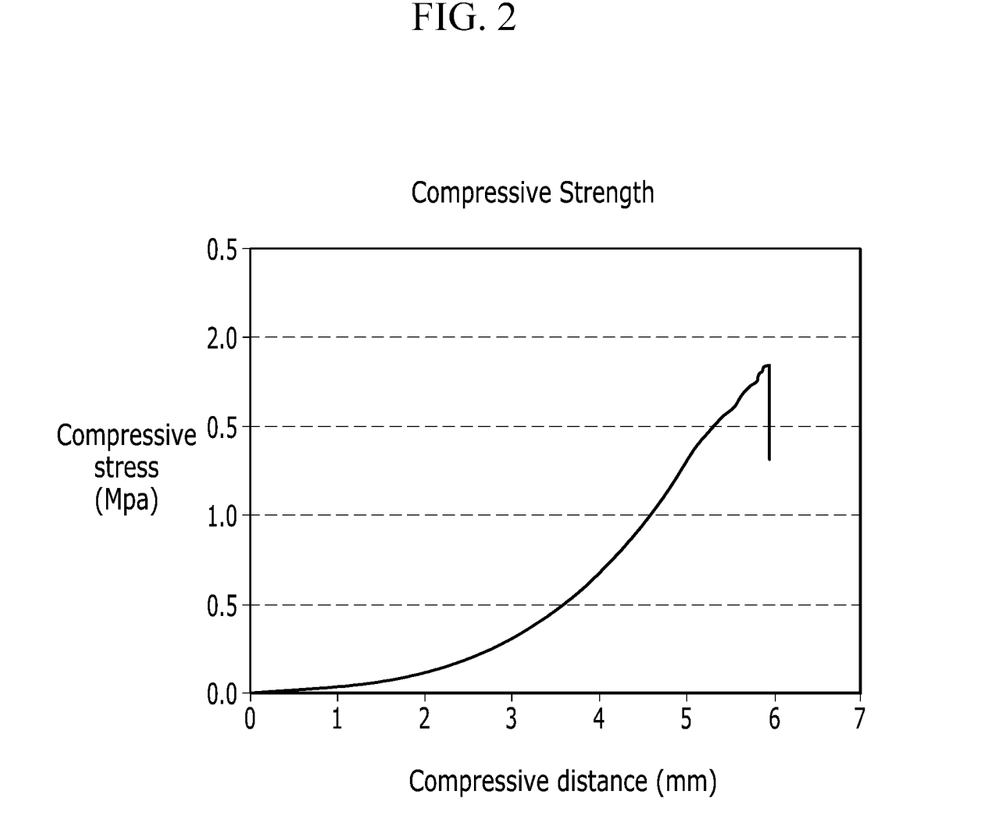
FIG. 2 is a graph showing compression strength results of a gel manufactured by dissolving materials for preparing a coating layer in an electrolyte solution of a rechargeable lithium battery according to Example 4.

FIG. 2 shows compression strength depending on compression distance when the gel including the electrolyte solution according to Example 4 was compressed to a break point.

As shown in Table 1 and FIG. 2, the gels including the electrolyte solution according to Examples 1 to 8 showed improved compression strength compared with those of the gels including the electrolyte solution according to Comparative Examples 1.

Evaluation 2: Adherence Evaluation

After putting a negative electrode and the 45 mm-wide and 60 mm-long separator according to each of the Examples 1 to 8 and Comparative Example 1 in a pouch container and respectively injecting each electrolyte solution according to Examples 1 to 8 and Comparative Example 1, the negative electrode and the separator were impregnated in the electrolyte solution and heat-pressed and then, adherence therebetween was evaluated by performing a peeling test at a speed of 10 mm/min with a property tester, Instron 3344.

The obtained results were converted into strength per a unit width (N/mm) based on the peeling strength (N) relative to the width direction (45 mm) of a specimen.

The adherence measurement results are provided in the following Table 1 and FIG. 3.

Figure 3:
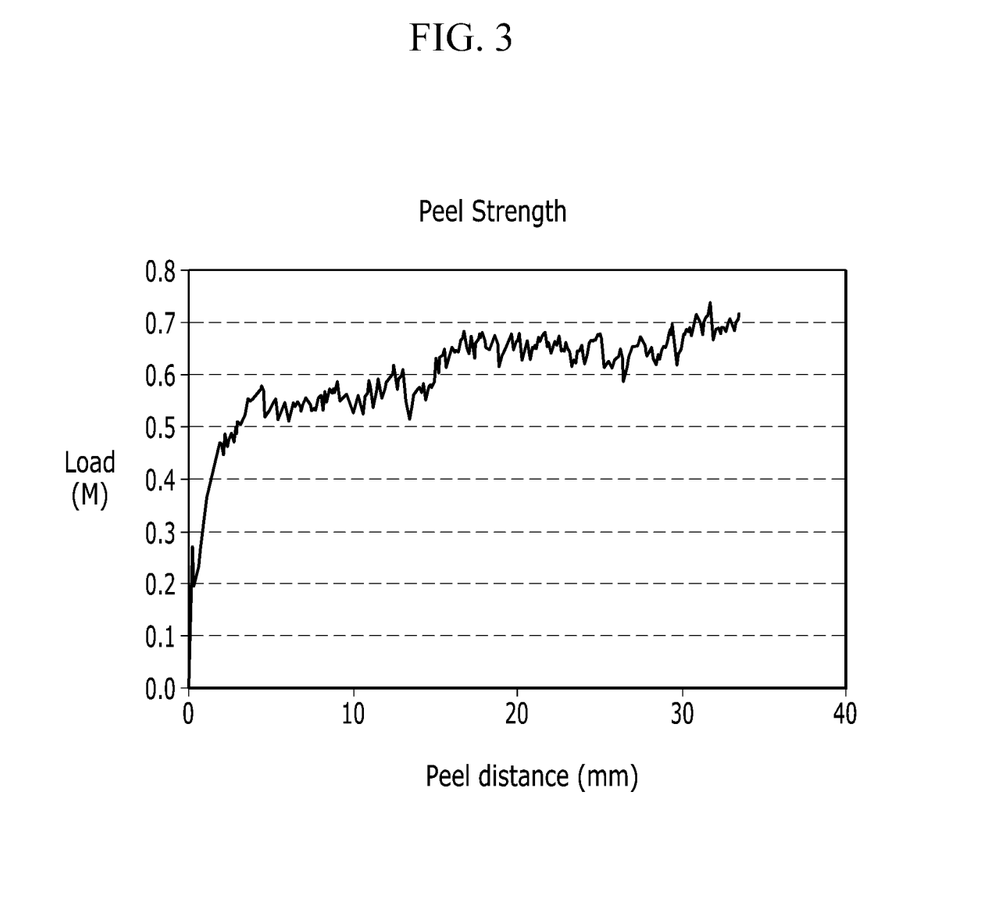
FIG. 3 is a graph showing adherence results between the negative electrode and the separator for a rechargeable lithium battery according to Example 4.

FIG. 3 shows the result of the electrolyte solution according to Example 4.

As shown in Table 1 and FIG. 3, the electrolyte solutions according to Examples 1 to 8 resulted in more improved adherence between the negative electrode and the separator than the electrolyte solution according to Comparative Example 1. The reason is that the appropriate electrolyte solution composition according to the present invention improved adherence between a PVdF component coated on the separator and the negative electrode.

according to Comparative Example 2, and accordingly, higher amounts of fluoroethylene carbonate in the same electrolyte solution composition may bring about better cycle-life.

According to some embodiments, the fluoroethylene carbonate plays a role of forming a film on a negative electrode as an additive thus improving cycle-life of the battery. In addition, it belongs to cyclic carbonates and may improve the cycle-life of the battery when larger amounts are included.

Since cyclic carbonate has high solubility in PVdF, the more cyclic carbonate is included, the higher solubility in PVdF it has. Accordingly, the cyclic carbonate may have a positive influence on improving compression strength and adherence between the electrode and the separator.

The cell according to Example 8 included more cyclic carbonate than the cells according to Examples 4 to 7 but showed slightly deteriorated cycle-life due to high viscosity of ethylene carbonate and propylene carbonate.

Evaluation 4: High Temperature Storage Evaluation

The cells according to Examples 1 to 8 and Comparative Examples 1 and Comparative Example 2 were under a CC-CV condition of 0.7C/4.3V and a cut-off condition of 0.025C and then, were evaluated regarding storage at 60° C.

TABLE 1

| | Electrolyte solution (vol %) | | | | Lithium salt (M) | Additive (part by weight) | Compression strength | Adherence |
|---|---|---|---|---|---|---|---|---|
| | EC | PC | EMC | DEC | LiPF$_6$ | FEC | (MPa) | (N/mm) |
| Example 1 | 20 | 0 | 50 | 30 | 1.15 | 5 | 1.64 | 0.007 |
| Example 2 | 30 | 0 | 40 | 30 | 1.15 | 5 | 1.76 | 0.009 |
| Example 3 | 30 | 0 | 40 | 30 | 1.15 | 7 | 1.79 | 0.010 |
| Example 4 | 30 | 0 | 40 | 30 | 1.15 | 10 | 1.84 | 0.013 |
| Example 5 | 30 | 0 | 40 | 30 | 1.15 | 15 | 1.89 | 0.015 |
| Example 6 | 30 | 0 | 40 | 30 | 1.15 | 20 | 1.95 | 0.018 |
| Example 7 | 30 | 0 | 40 | 30 | 1.15 | 30 | 2.11 | 0.025 |
| Example 8 | 30 | 15 | 25 | 30 | 1.15 | 10 | 2.03 | 0.021 |
| Comparative Example 1 | 10 | 0 | 60 | 30 | 1.15 | 5 | 1.38 | 0.003 |

Evaluation 3: Room Temperature Cycle-life Evaluation

The cells according to Examples 1 to 8 and Comparative Examples 1 and 2 (capacity: 1C=1600 mAh) were 350 times charged and discharged under the following conditions, and capacity retention of the cells was obtained as a percentage % based on capacity of the cells at the first cycle.

Charge: 0.7C/4.3V of a CC-CV condition, 0.025C cut-off
Discharge: 0.5C of a CC condition, 3.0V cut-off The room temperature cycle-life evaluation results are provided in the following Table 2 and FIG. 4.

Figure 4:
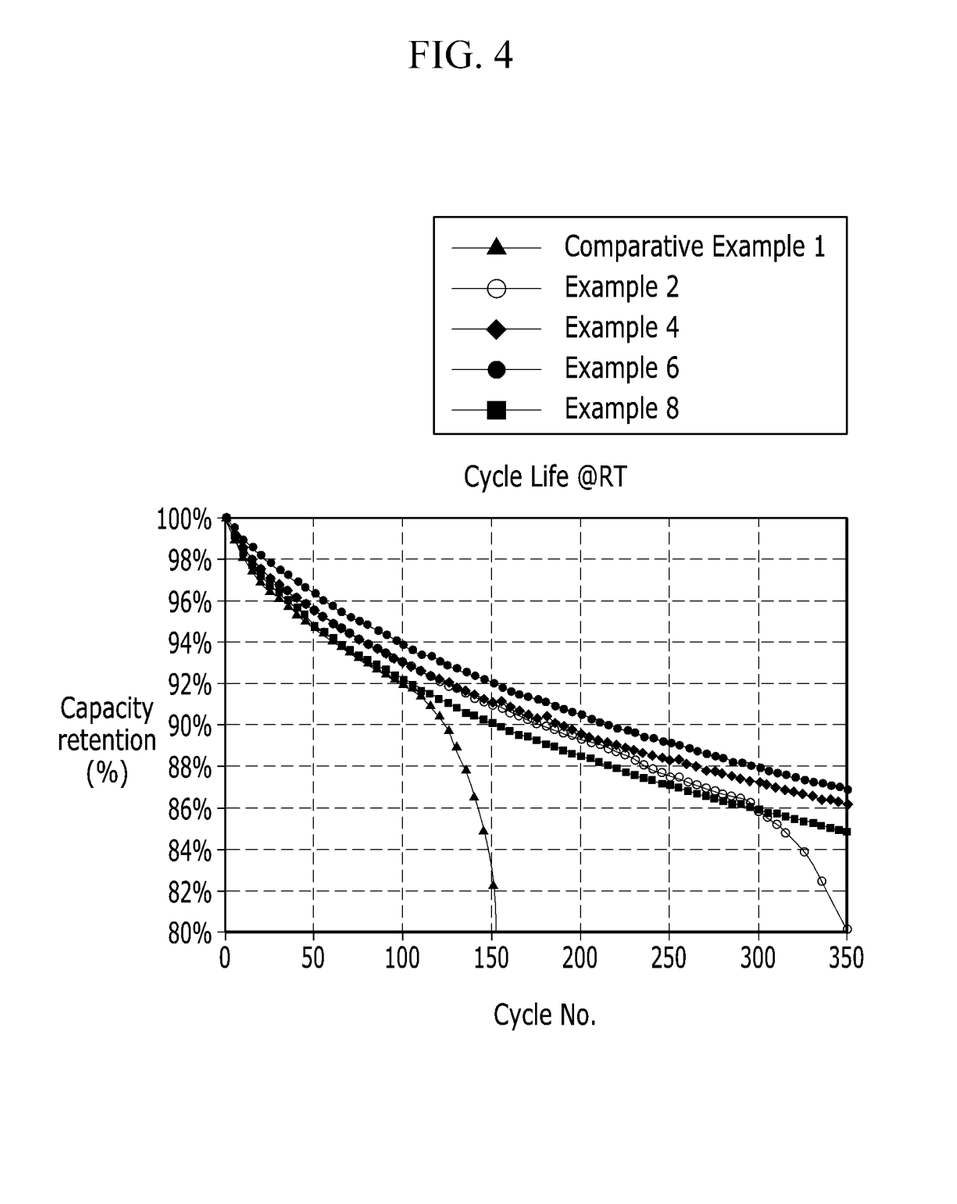
FIG. 4 is a graph showing room temperature cycle-life characteristics results of rechargeable lithium battery cells according to Examples 2, 4, 6, and 8 and Comparative Example 1.

FIG. 4 shows the results of Examples 2, 4, 6, 8, and Comparative Example 1.

As shown in the following Table 2 and FIG. 4, the cells including cyclic carbonate in a higher amount and a coating layer according to Examples 1 to 8 showed improved cycle-life characteristics compared with the cell including cyclic carbonate in a lower amount according to Comparative Example 1 and the cell including no coating layer for 30 days, and increases in thickness of the cells were measured every 5 days to calculate a battery swelling degree as a percentage %.

The high temperature storage evaluation results are provided in the following Table 2 and FIG. 5.

Figure 5:
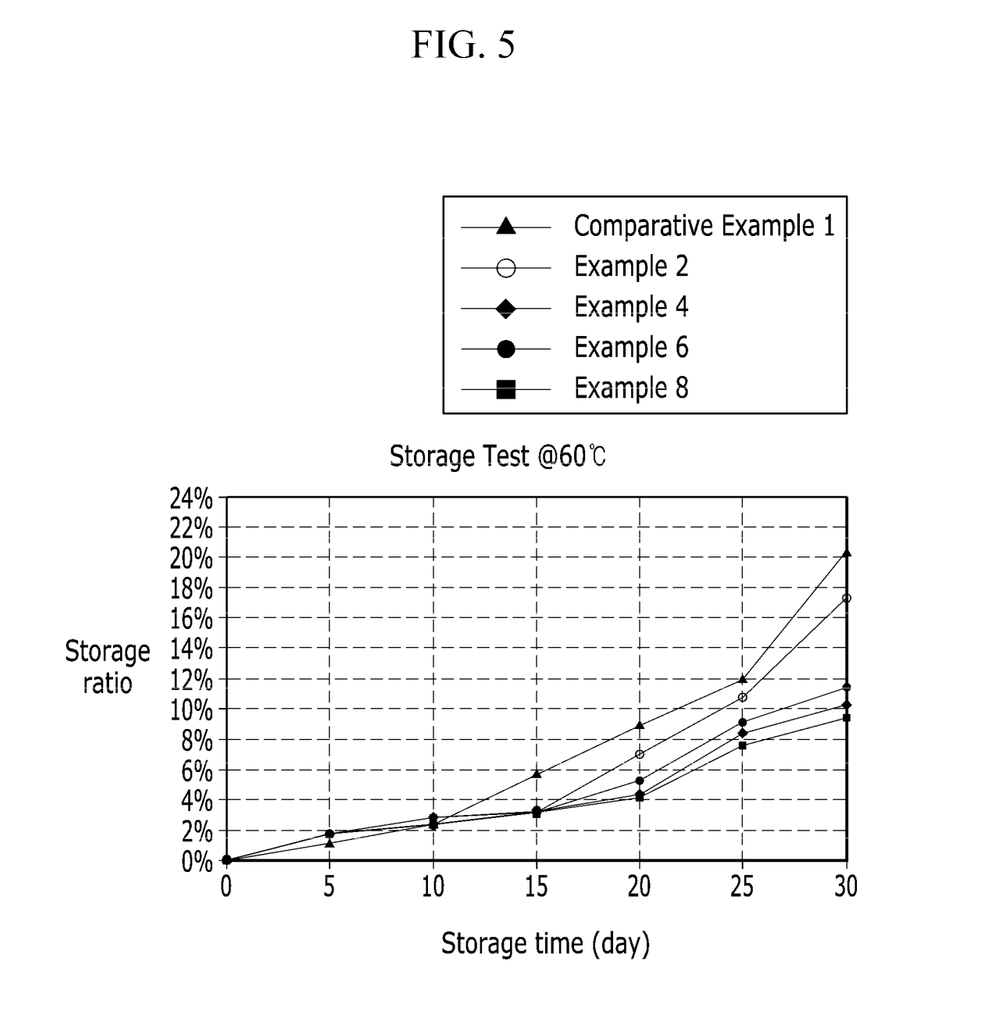
FIG. 5 is a graph showing high temperature storage results of the rechargeable lithium battery cells according to Examples 2, 4, 6, and 8 and Comparative Example 1.

FIG. 5 shows the high temperature storage evaluation results of the cells according to Examples 2, 4, 6, and 8 and Comparative Example 1.

As shown in the following Table 2 and FIG. 5, the cells including cyclic carbonate in a higher amount according to Examples 1 to 8 showed higher adherence between the electrode and the separator than the cell including cyclic carbonate in a lower amount according to Comparative Example 1 and thus, were not easily deformed by gas generated during storage at a high temperature and showed improved storage characteristic at a high temperature. In addition, the cells including a coating layer according to Examples 1 to 8 showed better high temperature storage characteristics than the cell including no coating layer according to Comparative Example 2.

TABLE 2

| | Electrolyte solution (vol %) | | | | Lithium salt (M) | Additive (parts by weight) | Room temperature cycle-life (% after 350 times) | High temperature storage (% after 30 days) |
|---|---|---|---|---|---|---|---|---|
| | EC | PC | EMC | DEC | LiPF$_6$ | FEC | | |
| Example 1 | 20 | 0 | 50 | 30 | 1.15 | 5 | 72.7 | 19.0 |
| Example 2 | 30 | 0 | 40 | 30 | 1.15 | 5 | 81.0 | 17.3 |
| Example 3 | 30 | 0 | 40 | 30 | 1.15 | 7 | 82.3 | 11.2 |
| Example 4 | 30 | 0 | 40 | 30 | 1.15 | 10 | 86.2 | 10.3 |
| Example 5 | 30 | 0 | 40 | 30 | 1.15 | 15 | 86.4 | 10.7 |
| Example 6 | 30 | 0 | 40 | 30 | 1.15 | 20 | 86.8 | 11.4 |
| Example 7 | 30 | 0 | 40 | 30 | 1.15 | 30 | 87.4 | 13.5 |
| Example 8 | 30 | 15 | 25 | 30 | 1.15 | 10 | 84.9 | 9.4 |
| Comparative Example 1 | 10 | 0 | 60 | 30 | 1.15 | 5 | NG | 20.5 |
| Comparative Example 2 | 30 | 0 | 40 | 30 | 1.15 | 10 | NG | 27.3 |

Based on Evaluations 1 to 4, cycle-life and high temperature storage characteristics of a cell may be improved by appropriately adjusting an electrolyte solution composition and the amounts of fluoroethylene carbonate.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A rechargeable lithium battery comprising:
   a positive electrode comprising a positive active material comprising nickel;
   a negative electrode comprising a negative active material comprising a Si-based material and a carbon-based material,
      the Si-based material being a composite consisting of Si and C, and the carbon-based material comprising an amorphous carbon,
   an electrolyte solution comprising a lithium salt, a non-aqueous organic solvent, and an additive;
      the non-aqueous organic solvent comprising a cyclic carbonate and a linear carbonate,
      the linear carbonate comprising ethylmethyl carbonate and dimethyl carbonate;
      the additive being selected from fluoroethylene carbonate, vinylethylene carbonate, propane sultone, succinonitrile, adiponitrile, and combinations thereof; and
   a separator between the positive electrode and the negative electrode, the separator comprising a porous substrate;
      the porous substrate comprising polyethylene and aramid.

2. The rechargeable lithium battery of claim 1, wherein the separator further comprises a coating layer positioned on at least one side of the porous substrate.

3. The rechargeable lithium battery of claim 2, wherein the coating layer comprises a fluorine-based polymer, an inorganic compound, or a combination thereof.

4. The rechargeable lithium battery of claim 3, wherein the inorganic compound comprises $Al_2O_3$, $Al(OH)_3$ or a combination thereof.

5. The rechargeable lithium battery of claim 3, wherein the fluorine-based polymer comprises polyvinylidene fluoride (PVdF), a polyvinylidene fluoride-hexafluoropropylene (PVdF-HFP) copolymer, or a combination thereof.

6. The rechargeable lithium battery of claim 1, wherein an amount of linear carbonate comprising ethylmethyl carbonate and dimethyl carbonate is at least about 40 volume % based on a total amount of the non-aqueous organic solvent.

7. The rechargeable lithium battery of claim 6, wherein an amount of ethylmethyl carbonate is about 10 volume % to about 70 volume % based on the total amount of the non-aqueous organic solvent.

8. The rechargeable lithium battery of claim 6, wherein an amount of dimethyl carbonate is about 10 volume % to about 70 volume % based on the total amount of the non-aqueous organic solvent.

9. The rechargeable lithium battery of claim 1, wherein the additive is in an amount of about 5 parts by weight to about 30 parts by weight based on 100 parts by weight of the non-aqueous organic solvent.

10. The rechargeable lithium battery of claim 1, wherein the separator has a thickness ranging from about 10 μm to about 30 μm.

11. The rechargeable lithium battery of claim 1, wherein the positive active material comprises a nickel-containing compound selected from LiaNi1-b-cCobRcDα (wherein, 0.90≤a≤1.8, 0≤b≤0.5, 0≤c≤0.05 and 0<α<2, R is Al or Mn, and D is O, F, S, P, or a combination thereof); LiaNi1-b-cCobRcO2-αZα (wherein, 0.90≤a≤1.8, 0≤b≤0.5, 0≤c≤0.05 and 0<α<2, R is Al or Mn, and Z is F, S, P, or a combination thereof); LiaNi1-b-cMncCobDα (wherein, 0.90≤a≤1.8, 0≤b≤0.5, 0≤c≤0.05 and 0<α<2, and D is O, F, S, P, or a combination thereof); LiaNi1-b-cMncCobO2-αZα (wherein, 0.90≤a≤1.8, 0≤b≤0.5, 0≤c≤0.05 and 0<α<2, and Z is F, S, P, or a combination thereof); LiaNibEcGdO2 (wherein, 0.90≤a≤1.8, 0≤b≤0.9, 0≤c≤0.5 and 0.001≤d≤0.1, E is Co; G is Al or Mn); and LiaNibCocMndGeO2 (wherein, 0.90≤a≤1.8, 0≤b≤0.9, 0≤c≤0.5, 0≤d≤0.5 and 0.001≤e≤0.1, G is Al, Cr, Mn, Fe, Mg, La, Ce, Sr, V, or a combination thereof).

12. The rechargeable lithium battery of claim 2, wherein the coating layer is positioned on both sides of the porous substrate.

13. The rechargeable lithium battery of claim 1, wherein the battery is a pouch battery.

14. The rechargeable lithium battery of claim 1, wherein the battery is a cylindrical battery.

15. The rechargeable lithium battery of claim 1, wherein the carbon-based material comprises a crystalline carbon.

16. The rechargeable lithium battery of claim 1, wherein the composite consisting of Si and C is a composite of Si-nano wire and carbon, a composite of Si-nano particle and carbon, or a combination thereof.

* * * * *

UNITED STATES PATENT AND TRADEMARK OFFICE
CERTIFICATE OF CORRECTION

PATENT NO. : 11,476,542 B2
APPLICATION NO. : 16/685749
DATED : October 18, 2022
INVENTOR(S) : Kwang-Jo Cheong et al.

It is certified that error appears in the above-identified patent and that said Letters Patent is hereby corrected as shown below:

In the Claims

Column 16, Line 45, Claim 11    Delete "$0<\alpha<2$," and
Insert -- $0<\alpha\leq2$, --

Signed and Sealed this
Eighteenth Day of July, 2023

Katherine Kelly Vidal
*Director of the United States Patent and Trademark Office*